US008199901B2

(12) United States Patent
Rani et al.

(10) Patent No.: US 8,199,901 B2
(45) Date of Patent: Jun. 12, 2012

(54) METHOD AND APPARATUS FOR CUSTOMER RETENTION

(75) Inventors: Ananth Rani, Fremont, CA (US); Pramod Jajoo, Bangalore (IN); Justin Falk, Mountain View, CA (US)

(73) Assignee: Xora, Inc., Mountain View, CA (US)

( * ) Notice: Subject to any disclaimer, the term of this patent is extended or adjusted under 35 U.S.C. 154(b) by 1523 days.

(21) Appl. No.: 11/649,421

(22) Filed: Jan. 4, 2007

(65) Prior Publication Data
US 2008/0167934 A1      Jul. 10, 2008

(51) Int. Cl.
*H04M 3/00* (2006.01)
(52) U.S. Cl. ............... 379/265.03; 379/88.17; 705/7.29; 705/21
(58) Field of Classification Search ............... 379/88.17; 705/7.29, 21
See application file for complete search history.

(56) References Cited

U.S. PATENT DOCUMENTS

| 6,724,887 | B1 * | 4/2004 | Eilbacher et al. | 379/265.03 |
| 7,151,826 | B2 * | 12/2006 | Shambaugh et al. | 379/265.02 |
| 7,577,246 | B2 * | 8/2009 | Idan et al. | 379/265.01 |
| 7,801,761 | B2 * | 9/2010 | Varadarajan et al. | 705/7.29 |

* cited by examiner

*Primary Examiner* — Md S Elahee
(74) *Attorney, Agent, or Firm* — Moser Taboada

(57) ABSTRACT

Method and apparatus that facilitates customer retention, churn reduction, and customer satisfaction by predicting customer churn and taking an appropriate action to retain a customer is described. In an example, a customer retention method acquires information indicative of customer service usage by customers. The customer retention method then provides an analysis of the acquired information. The analysis predicts the likelihood of churn for each customer. The customer retention method then identifies affected customers based on the analysis. The customer retention method then automatically selects customer support executives to initiate an action for each of the affected customers. The customer retention method selects the customer support executives based on skill in handling the affected customers, among other factors.

14 Claims, 4 Drawing Sheets

METHOD AND APPARATUS FOR CUSTOMER RETENTION

BACKGROUND OF THE INVENTION

1. Field of the Invention

Embodiments of the present invention generally relate to a method and system for handling customers and, more specifically, for aiding customer retention, churn reduction, and customer satisfaction.

2. Description of the Related Art

The importance of customer service has grown with the rising dominance of the service sector in the global economy and has a huge impact on individuals, households, firms, and societies. Today, in addition to delivering high-quality products, an organization has to offer quality service to its customers. To offer quality service, the organization may need to monitor satisfaction level of its customers to minimize customer turnover or churn.

Customer churn is a substantive problem for service providers in general. The service providers activate services to attract the customers, but often find it difficult to retain its customers. This is more pronounced when the service providers do not have ongoing contractual agreements with the end customers.

Traditional techniques for retaining customers involve substantial help from customer support executives. These techniques are labor intensive, non-scalable and extremely expensive, especially for service providers offering a low cost service.

Thus, there is a need for a solution that provides an indication or warning automatically to a service provider indicative of customer dissatisfaction to enable the service provider to address customer problems at an early stage.

SUMMARY OF THE INVENTION

The present invention relates to a method and apparatus that facilitates customer retention, churn reduction, and customer satisfaction by predicting customer churn and taking an appropriate action to retain a customer.

An aspect of the present invention provides a customer retention method. The customer retention method acquires information indicative of customer service usage by customers. The customer retention method then provides an analysis of the acquired information. The analysis predicts the likelihood of churn for each customer. The customer retention method then identifies affected customers based on the analysis. The customer retention method then automatically selects customer support executives to initiate an action for each of the affected customers. The customer retention method selects the customer support executives based on skill in handling the affected customers, among other factors.

In another aspect, the present invention provides a customer retention system. The customer retention system comprises a customer information module, an analyzer, a customer identification module and a customer retention module. The customer information module acquires information indicative of customer service usage by customers. The analyzer provides an analysis of the information, which predicts the likelihood of churn for each of the customers. The customer identification module identifies affected customers based on the analysis. The customer retention module automatically selects customer support executives based on skill in handling the affected customers to initiate an action. In one embodiment, the analyzer may interface with a communicator module that transmits this information in near real-time to external entities such as wireless carrier partners to proactively contact the customer and prevent churn from happening.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
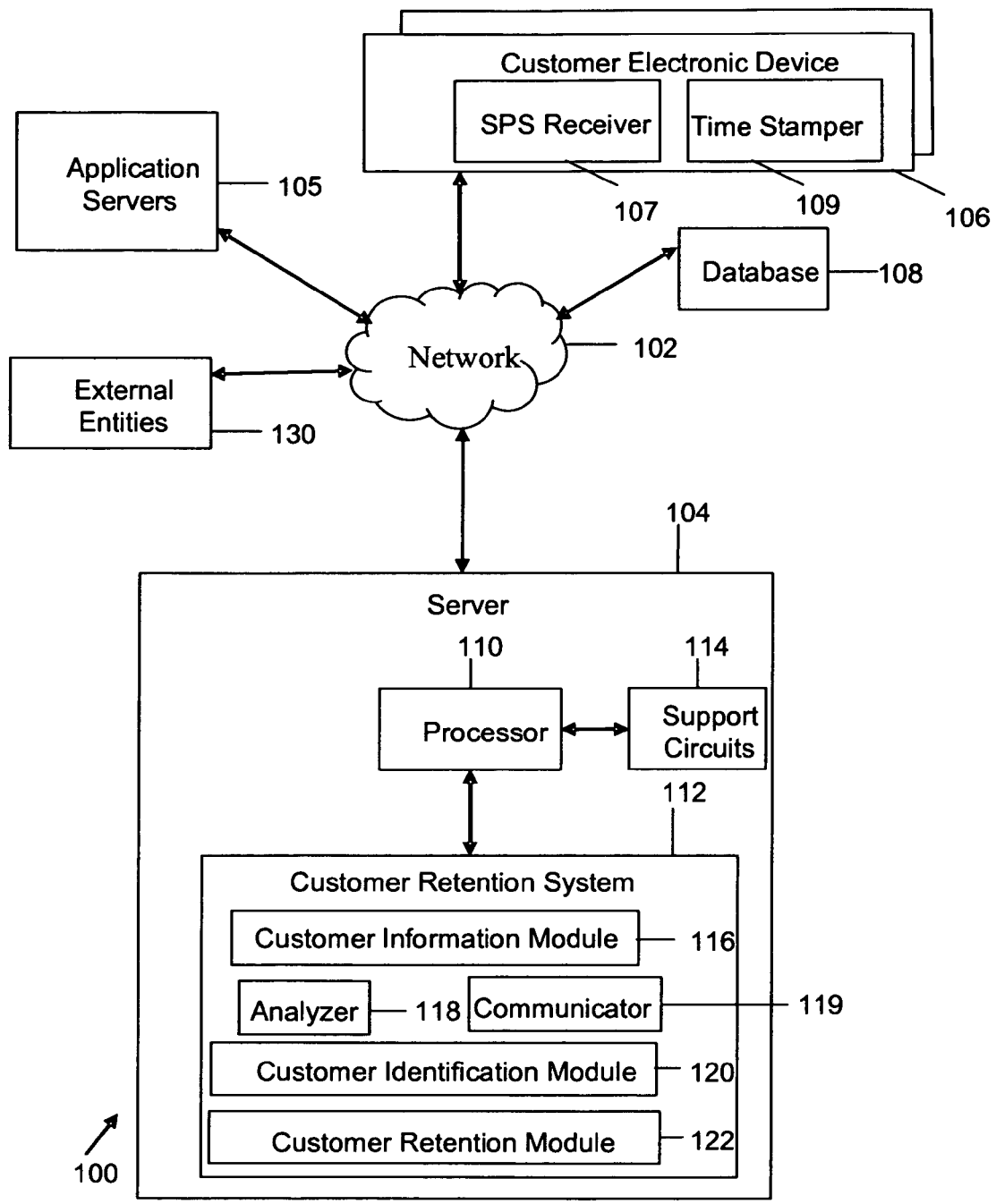
FIG. 1 is a block diagram depicting an exemplary embodiment of a communication system in accordance with one or more aspects of the invention.

FIG. 1 is a block diagram depicting an exemplary embodiment of a communication system 100 in accordance with one or more aspects of the invention. The communication system 100 includes customer electronic devices 106, a network 102, a server 104, a database 108, and various application servers 105. Network 102 is coupled to server 104, application servers 105, database 108, and customer electronic devices 106. Network 102 can be a packet-switched network, a circuit-switched network, a wireless network, or a combination thereof. In an embodiment of the present invention, the packet-switched network is the Internet. In another embodiment, packet-switched network is a Metropolitan Area Network (MAN). In yet another embodiment, packet-switched network is a Wide Area Network (WAN). Further, in various embodiments of the present invention, packet-switched network may be, for example, an Internet Protocol (IP) network, an Asynchronous Transfer Mode (ATM) network, etc. In various embodiments, network 102 may include a Global System for Mobile Communications (GSM) network, a Code Division Multiple Access (CDMA) network, or like type wireless network known in the art.

In various embodiments of the invention, customer electronic device 106 may be a fixed line device (including a Voice over Internet Protocol (VoIP) phone, Personal Computer (PC) desktop client, etc.) or a mobile device, such as a cellular telephone, personal digital assistant (PDA), laptop computer, or the like. In an embodiment, one or more of the customer electronic devices 106 includes a satellite positioning system (SPS) receiver 107 and a time-stamping module 109. The SPS receiver 107 is configured to determine the location of the customer electronic device 106 using SPS satellite signals as is well known in the art (e.g., a global positioning system (GPS) receiver). The time stamping module 109 is configured to determine a time-of-day, which may be derived from the SPS receiver 107 and/or the network 102 as is well known in the art.

The customer electronic devices 106 are configured to communicate with the application servers 105. Each of the application servers 105 is configured to provide a particular service to one or more of the customer electronic devices 106. For example, in one embodiment, one or more of the application servers 105 is configured to provide a job tracking service. A customer electronic device 106 is used to report various events to an application server 105 and receive various data related to jobs from an application server 105. For example, a customer electronic device 106 may report a dock in by an employee, receive information for one or more specific jobs, receive a report that an employee is traveling to a specific job, receive a report that a job has been started, receive a report that a job has been completed, and receive a clock out by an employee. Each of these reported items may include a time-stamp and/or location stamp. Those skilled in the art will appreciate that the application servers 105 may implement other types of services that require periodic transactions with the customer electronic devices 106.

Database 108 stores customer information generated by the transactions between the application servers 105 and the customer electronic devices 106. In an embodiment of the invention, various items or records of the customer information stored in the database 108 include timestamps and/or location stamps. The customer information may include data generated in response to transmissions by customer electronic device 106. The customer information stored in database 108 may be utilized by server 104 while conducting analysis, as described further below. The database 108 is a logical unit of storage. In an embodiment, the database 108 may be formed from a portion of the overall storage of a physical device, by the storage of an entire physical device or by the storage of multiple physical devices combined together.

Server 104 comprises a processor 110, a memory 112, and support circuits 114. Memory 112 and support circuits 114 are coupled to processor 110. The processor 110 may include one or more microprocessors known in the art. The support circuits 114 for the processor 110 include conventional cache, power supplies, clock circuits, data registers, I/O interfaces, and the like. The memory 112 may include one or more of the following random access memory, read only memory, magneto-resistive read/write memory, optical read/write memory, cache memory, magnetic read/write memory, and the like, as well as signal-bearing media as described below. In an embodiment, the server 104 is one of the application servers 104 configured to provide a particular service. As described below, the server 104 is also configured to implement a customer retention system. Alternatively, the server 104 is configured to only implement the customer retention system.

The memory 112 stores processor-executable instructions and/or data that may be executed by and/or used by the processor 110. These processor-executable instructions may comprise hardware, firmware, software, and the like, or some combination thereof. In one embodiment, modules having processor-executable instructions that are stored in the memory 112 define customer retention system that comprises a customer information module 116, an analyzer 118, a customer identification module 120 and a customer retention module 122. Customer information module 116 generates information indicative of customer service usage. In an embodiment, the customer information module 116 generates such information from the customer information stored in the database 108. Analyzer 118 provides an analysis of the information acquired by the customer information module 116, which predicts the likelihood of churn for each of the customers. Customer identification module 120 identifies at least one affected customer based on the analysis. Customer retention module 122 automatically selects a customer support executive based on skill required for handling the affected customer to initiate an action. The features of these modules are described in more detail below.

In another embodiment, the memory 112 includes a communication module 119. The communication module 119 sends information produced by the analyzer 118, the customer identification module 120, and/or the customer retention module 122 to one or more external entities 130. An external entity may include, for example, a wireless carrier partnered with the operator of the server 104. The wireless carrier provides wireless service to the customer electronic devices 106, for example. The external entities 130 may use the information to proactively contact the affected customers to prevent churn. For example, the external entities 130 may instruct the customer support executive selected by the customer retention module 122 to initiate the action. Alternatively, the external entities 130 may perform selection of the appropriate customer support executive themselves based on the at least one affected customer identified by the customer identification module 120. That is, each of the entities 130 may include their own version of a customer retention module that operates similarly to the customer retention module 122. In yet another example, the external entities 130 may identify the at least one affected customer and select the appropriate customer support executive themselves based on the analysis performed by the analyzer 118. That is, each of the entities 130 may include their own versions of customer identification and retention modules that operate similarly to the customer identification and retention modules 120 and 122. The information may be sent from the server 104 to the external entities 130 through the network 102 in real-time or near real-time.

Figure 2:
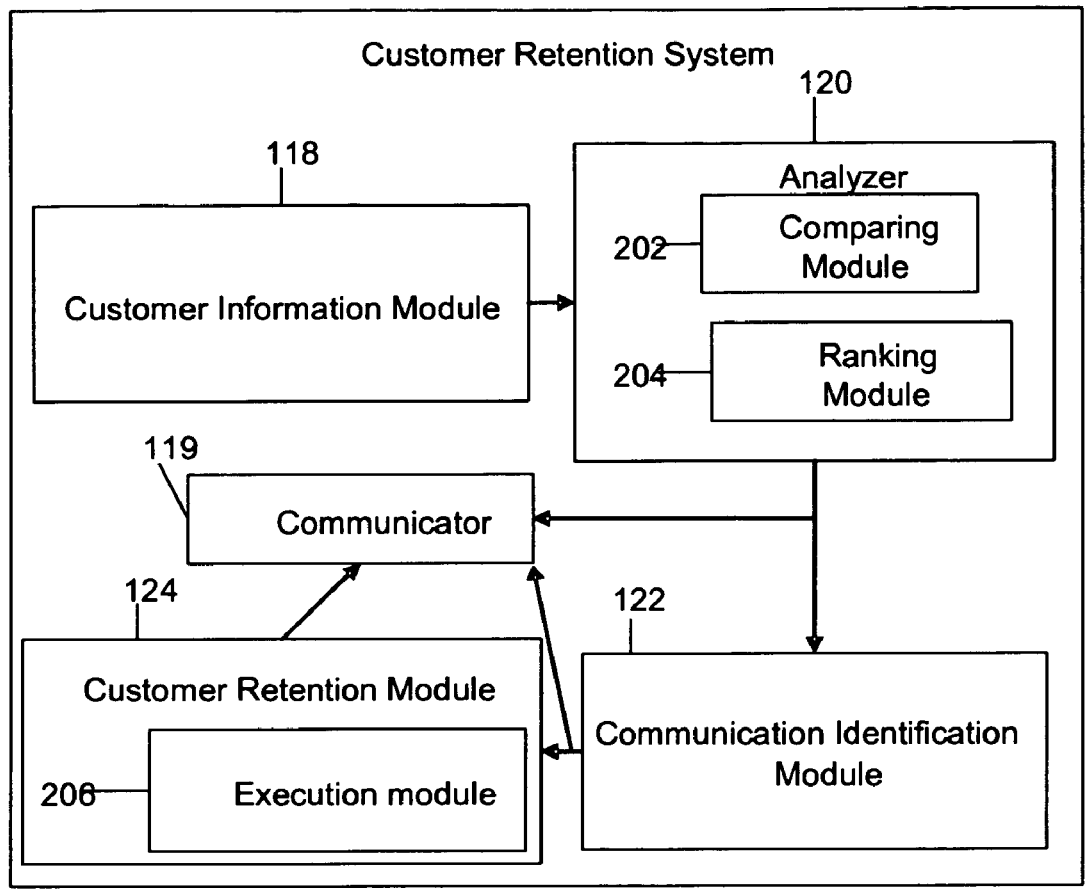
FIG. 2 is a block diagram of a customer retention system in accordance with another embodiment of the invention.

FIG. 2 is a block diagram depicting an exemplary embodiment of a customer retention system 200 in accordance with an embodiment of the invention. Elements of FIG. 2 that are the same as those in FIG. 1 are designated with identical reference numerals. In an embodiment, customer information module 116 generates information indicative of a customer service usage. The customer information module 116 may analyze the customer information in the database 108, such as time records, location records, job records, website login information, and like type transaction data associated with a service (e.g., job tracking service), to obtain a measure of usage of the service ("service usage information"). For example, the customer information module 116 may record the number of records transmitted. In an embodiment of the invention, the customer service usage information includes sets of information corresponding to periods of time (e.g., a set of information for each month, each week, each day, etc.).

Analyzer 118 analyzes the acquired customer's service usage information. Analyzer 118 may use analysis tools to predict the likelihood of churn of each customer. For example, analyzer 118 analyzes the service usage information for a customer. Analyzer 118 compares usage from previous time periods to current time periods and determines if fewer handsets from a customer's handset base are reporting transaction data. Given the customer service usage information, analyzer 118 ranks the customers based on likelihood of churn. The ranks help in determining which customers may be under-utilizing the provided services and/or have an increased probability of terminating the services, referred to as affected customers.

In an embodiment of the invention, analyzer 118 includes a comparing module 202 and a ranking module 204. Comparing module 202 is configured to compare sets of service usage data associated with different periods. For example, comparing module 202 may compare a first information set to a second information set to produce comparison results. For example, the first set of information may include information regarding usage information in the month of January, and the second set of information may include information regarding usage information in the month of February. Ranking module 204 analyzes the comparison results and ranks the customers based on a scale representative of predicted likelihood of churn. For example, a determination may be made by the comparison module 202 whether customer usage of a service has decreased from one time period to another. Ranking module 204 assigns a rank to each customer, with customers having the larger decreases in service usage having the higher ranks and customers having the lesser decreases or increases in service usage having the lower ranks.

Customer identification module 120 identifies the affected customer(s) based on the analysis performed by analyzer 118. For example, the customer identification module 120 may select customers having a rank higher than a threshold rank. Then, customer retention module 122 selects at least one customer support executive to initiate an action for each affected customer identified by customer identification module 120. The customer support executive may be selected based on the customer support executive's skill in handling affected customers, or the skill set required to handle the affected customer.

In an embodiment of the invention, customer retention module 122 automatically selects a customer support executive to initiate an action. In another embodiment of the invention, the type of problem faced by the customer may determine the selection of the customer support executive. In an embodiment of the invention, the action taken by a customer support executive may include initiating a customer retention program, which may include recommendations to increase customer service usage. However, any recommendations may be refined in real-time while the customer support executive is talking to the customer, such as by conducting a brief needs-assessment survey. The customer support executive may then feed the data acquired from the survey into the customer information module 116, and a new action may be generated based on the real-time predictive analysis carried out by analyzer 118.

Customer retention module 122 may include an execution module 206, which executes the customer retention program. For example, the customer retention program execution may include scheduling a visit to an affected customer by a customer support executive, who may be automatically selected based on the level of skill required for the customer. In another example, the customer retention program execution may include sending messages through email, short message service (SMS), telephone calls, pager, or fax to an affected customer. Such messages may include but are not limited to a discount offer one or more aspects of the provided service, a solution to a problem faced by the customer, or the like.

The communication module 119 is configured to receive the analysis from the analysis module 120, an indicia of the at least one affected customer from the customer identification module 122, and/or an indicia of the selected customer support executive. The communication module 119 is configured to send at least one of such data to one or more external entities.

Figure 3:
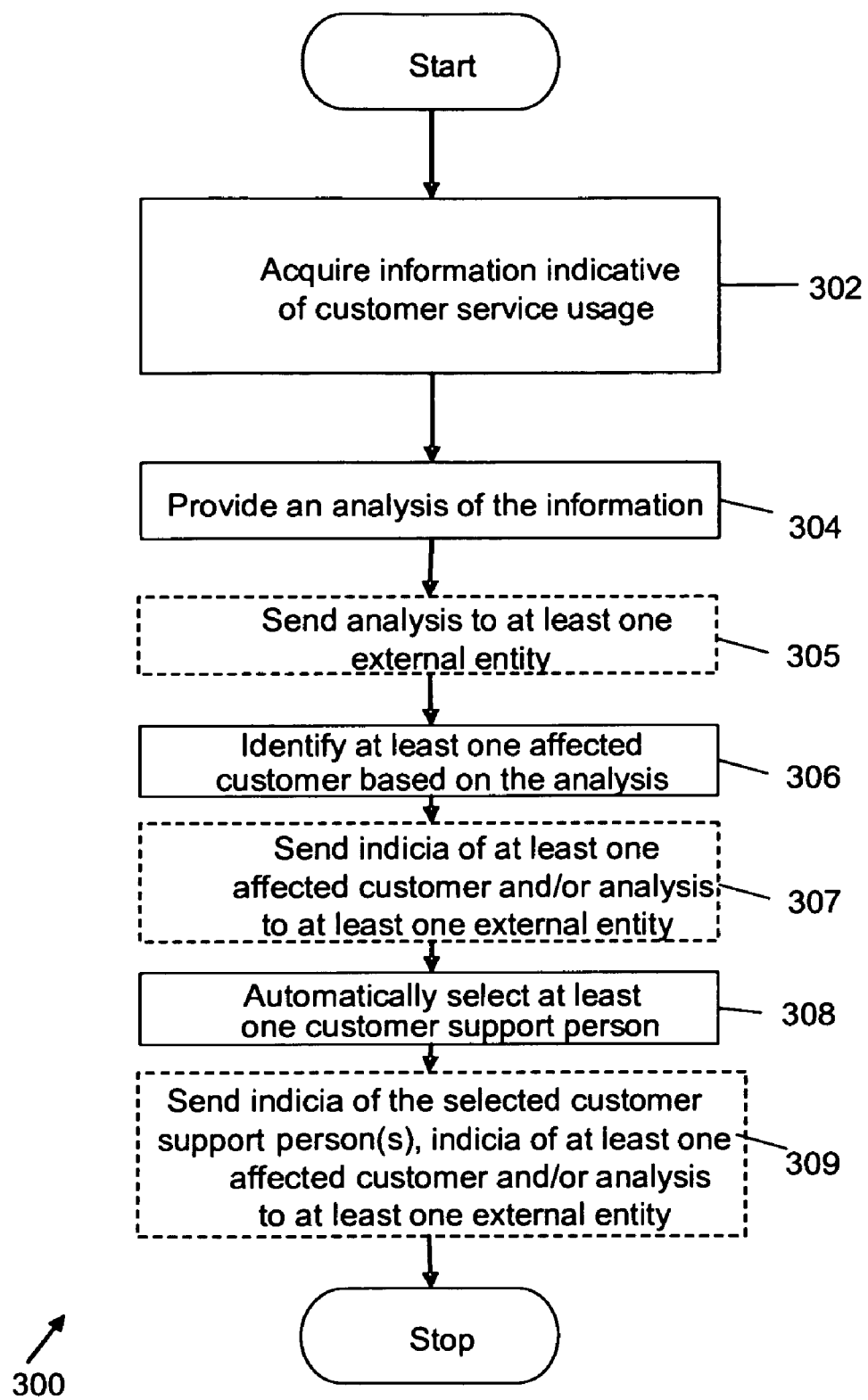
FIG. 3 is a flowchart of a customer retention method in accordance with an embodiment of the invention.

FIG. 3 is a flowchart of a customer retention method 300, in accordance with an embodiment of the invention. At step 302, server 104 acquires service usage information of at least one customer. In an embodiment, the provided service is a job-tracking service. The customer service usage information is based on customer information, such as time records, location records, job records, website login information, and like type transaction data. Also in an embodiment, the customer service usage information is acquired for predefined time intervals.

An analysis of the customer service usage information is provided at step 304. The analysis predicts the likelihood of churn for each customer, as described above. In another embodiment, statistical models may be used to generate data for predicting likelihood of churn for the customer. At optional step 305, the analysis is sent to at least one external entity.

At step 306, server 104 identifies at least one affected customer based on the analysis. An affected customer is a customer whose analysis indicates an increased likelihood of churn. The identification of at least one affected customer may further include a relative comparison of the analyses of the affected customers. Step 306 may be performed by the at least one external entity if the analysis is sent to the at least one external entity at step 305. At optional step 307, indicia of the at least one affected customer and/or the analysis is sent to the at least one external entity.

At step 308, server 104 selects at least one customer support executive automatically to initiate an action. The automatic selection is based on skill in handling the one or more affected customer. In an embodiment of the invention, the skill of the customer support executive in handling a customer is quantified by correlating the skill to a weighted mean rating. The weighted mean rating is a weighted mean of the ratings of the customer support executive on various parameters. These parameters may include, but are not limited to, qualities such as friendliness, helpfulness, courteousness, knowledge, accuracy, thoroughness, resourcefulness, empowerment, ability to recommend solutions, ability to anticipate needs, efficiency, trustworthiness, authenticity, reliability, responsibility, appropriateness of appearance and demeanor, and the like. The customer support executive may initiate an action that is aimed at retaining the customer. In an embodiment of the invention, such action comprises executing a customer retention program. In an embodiment of the invention, the customer retention program may comprise addressing problems faced by a customer, acquiring information from customers regarding their product choices and preferences. A customer support executive may visit affected customers at a scheduled time and execute the customer retention program. In another embodiment of the invention, the customer retention program execution comprises sending messages through email, Short Message Service (SMS), calls, pager, or fax to the customer. The message may comprise a discount offer on services, a solution to a problem faced by the customer, or the like.

Step 308 may be performed by the at least one external entity if indicia of the at least one affected customer and/or the analysis is sent to the at least one entity at step 307. At optional step 309, indicia of the selected customer support person(s), indicia of the at least one affected customer, and/or the analysis is sent to the at least one external entity.

Figure 4:
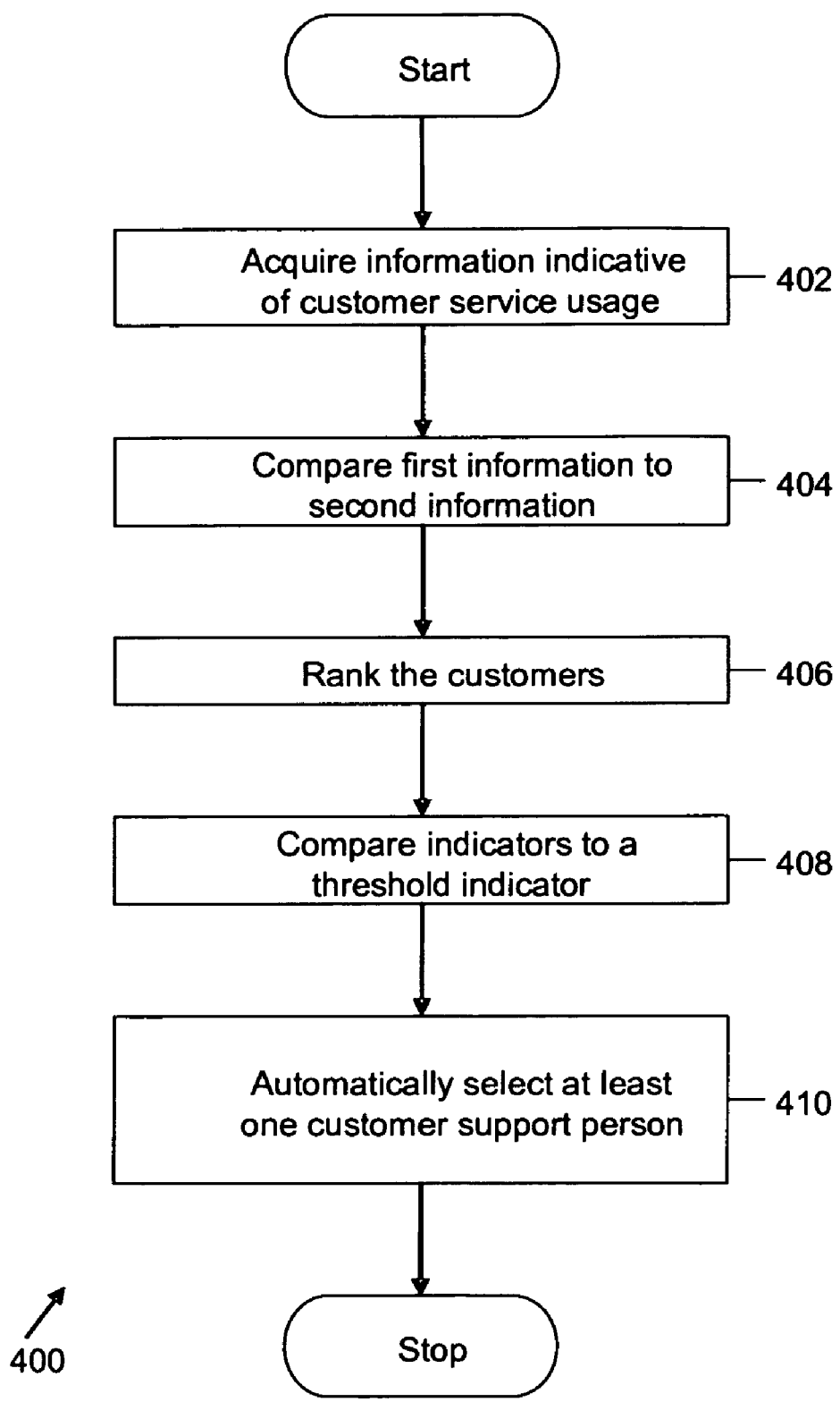
FIG. 4 is a detailed flowchart of the customer retention method in accordance with another embodiment of the invention.

FIG. 4 is a flowchart of the detailed customer retention method 400, in accordance with another embodiment of the invention. At step 402, server 104 acquires service usage information of at least one customer. At step 404, a first set of information corresponding to a first time period is compared to a second set of information corresponding to a second time period. For example, the first set of information may include information regarding customer interaction with a company in the month of January, and the second set of information may include information regarding customer interaction in the month of February. At step 406, customers are ranked based on the comparison of the results on a scale representative of predicted likelihood of customer churn.

For example, customers may be ranked on a three-level ranking scale comprising 3 for 'more attention needed', 2 for 'medium attention needed' and 1 for 'less attention needed'. 'More attention needed' for a customer may signify that the customer might be on a route to change vendor. 'Less attention needed' for a customer may signify that the customer might be highly satisfied or otherwise devoted and not considered a risk for changing vendor. For an exemplary data collection period, a decreasing trend in the usage of service made by a customer to may suggest a ranking of 3 for 'more attention needed'. However, the ranking may also depend on one or more threshold parameters which, for example, may be the average amount service usage by the customer. In this case, if the service usage is decreasing but is otherwise still above the average service usage, then the customer may be assigned a ranking of 2, for 'medium attention needed'.

At step 408, the rank assigned to each customer is compared to a threshold rank to identify the affected customer(s) as being the most likely to exhibit churn. In an embodiment of the invention, threshold rank may vary with the customer. Thereafter, at step 410, server 104 selects at least one customer support executive automatically to initiate an action.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

The present invention, in its various embodiments, advantageously provides a customer retention method and a customer retention system that help in customer retention, churn reduction, and customer satisfaction. It also advantageously provides a computer program which, when executed by a processor, performs the steps of a customer retention method. The present invention also advantageously provides a system that is scalable, that reduces costs and that is not labor intensive.

In the foregoing specification, specific embodiments of the present invention have been described. However, one of ordinary skill in the art will appreciate that various modifications and changes can be made without departing from the spirit and scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

The invention claimed is:

1. A customer retention method, comprising:
   acquiring information indicative of service usage by customers, wherein the information indicative of customer service usage comprises a first set of information corresponding to a first time period and a second set of information corresponding to a second time period;
   providing an analysis of the information that predicts the likelihood of churn for each of the customers, wherein the step of providing comprises: comparing the first set of information to the second set of information to produce comparison results; and assigning each of the customers a rank according to a scale representative of predicted likelihood of churn based on the comparison results;
   identifying at least one affected customer based on the analysis, wherein the step of identifying comprises: comparing the rank of each of the customers to a threshold rank to identify the at least one affected customer as being most likely to exhibit churn; and
   automatically selecting at least one customer support executive based on skill in handling the at least one affected customer to initiate an action.

2. The method of claim 1, wherein the information indicative of customer service usage is based on at least one of time records, location records, job information, or website login information transmitted to a server.

3. The method of claim 1, wherein the action comprises executing a customer retention program.

4. The method of claim 3, wherein the customer retention program execution comprises scheduling a visit to the at least one affected customer by a customer support executive.

5. The method of claim 3, wherein the customer retention program execution comprises sending messages to the customer through any one of email, (short message service) SMS, calls, pager, and fax.

6. The method of claim 1, further comprising:
   sending at least one of the analysis, indicia of the at least one affected customer, or indicia of the at least one customer support executive to an external entity.

7. A customer retention system comprising:
   a customer information module for acquiring information indicative of service usage by customers, wherein the information indicative of customer service usage comprises a first set of information corresponding to a first time period and a second set of information corresponding to a second time period;
   an analyzer for providing an analysis of the information that predicts the likelihood of churn for each of the customers, wherein the analyzer comprises: a comparing module for comparing the first set of information to the second set of information to produce comparison results; and a ranking module for assigning each of the customers a rank according to a scale representative of predicted likelihood of churn based on the comparison results;
   a customer identification module for identifying at least one affected customer based on the analysis, wherein the customer identification module is configured to compare the rank of each of the customers to a threshold rank to identify the at least one affected customer as being most likely to exhibit churn; and
   a customer retention module for automatically selecting at least one customer support executive based on skill in handling the at least one affected customer to initiate an action.

8. The system of claim 7, wherein the information indicative of customer service usage is based on at least one of time records, location records, job information, or website login information transmitted to a server.

9. The system of claim 7, wherein the customer retention module comprises an execution module for executing a customer retention program.

10. The system of claim 9, wherein the execution module is configured to schedule a visit to the at least one affected customer by a customer support executive.

11. A non-transitory computer readable medium for storing a computer program that, when executed by a processor, cause the processor to perform a customer retention method, comprising:

acquiring information indicative of service usage by customers, wherein the information indicative of customer service usage comprises a first set of information corresponding to a first time period and a second set of information corresponding to a second time period;

providing an analysis of the information that predicts the likelihood of churn for each of the customers, wherein the step of providing comprises: comparing the first set of information to the second set of information to produce comparison results; and assigning each of the customers a rank according to a scale representative of predicted likelihood of churn based on the comparison results;

identifying at least one affected customer based on the analysis, wherein the step of identifying comprises: comparing the rank of each of the customers to a threshold rank to identify the at least one affected customer as being most likely to exhibit churn; and automatically selecting at least one customer support executive based on skill in handling the at least one affected customer to initiate an action.

12. The computer readable medium of claim 11, wherein the information indicative of customer service usage is based on at least one of time records, location records, job information, or website login information transmitted to a server.

13. The computer readable medium of claim 11, wherein the action comprises executing a customer retention program.

14. The computer readable medium of claim 13, wherein the customer retention program execution comprises scheduling a visit to the at least one affected customer by a customer support executive.

\* \* \* \* \*